United States Patent
Davey et al.

(10) Patent No.: US 9,221,404 B2
(45) Date of Patent: Dec. 29, 2015

(54) METHOD AND SYSTEM FOR PROCESSING A HEADLINER

(75) Inventors: Geoffrey William Davey, Huntington Woods, MI (US); Charles M. Losicki, Clarkston, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 1237 days.

(21) Appl. No.: 12/593,418

(22) PCT Filed: Mar. 19, 2008

(86) PCT No.: PCT/CA2008/000510
§ 371 (c)(1),
(2), (4) Date: Nov. 23, 2010

(87) PCT Pub. No.: WO2008/119156
PCT Pub. Date: Oct. 9, 2008

(65) Prior Publication Data
US 2011/0057348 A1      Mar. 10, 2011

Related U.S. Application Data

(60) Provisional application No. 60/908,746, filed on Mar. 29, 2007.

(51) Int. Cl.
*B29C 37/02* (2006.01)
*B60R 13/02* (2006.01)
*B29C 70/02* (2006.01)
*B29C 44/56* (2006.01)
*B32B 5/02* (2006.01)
*B29C 51/14* (2006.01)

(52) U.S. Cl.
CPC ......... *B60R 13/0225* (2013.01); *B29C 44/5681* (2013.01); *B29C 70/026* (2013.01); *B32B 5/02* (2013.01); *B29C 51/145* (2013.01); *B60R 13/0212* (2013.01)

(58) Field of Classification Search
CPC .. B29C 44/5681; B29C 51/145; B29C 70/026
USPC ........................................................ 264/161
See application file for complete search history.

(56) References Cited

U.S. PATENT DOCUMENTS

| | | | |
|---|---|---|---|
| 4,464,494 A | 8/1984 | King et al. | |
| 4,824,714 A | 4/1989 | Gest | |
| 5,348,604 A * | 9/1994 | Neff | 156/272.8 |
| 6,103,049 A | 8/2000 | Batdorf | |
| 6,500,369 B1 * | 12/2002 | Gorowicz et al. | 264/46.5 |

(Continued)

FOREIGN PATENT DOCUMENTS

| | | |
|---|---|---|
| EP | 870583 A2 | 10/1998 |
| WO | 0242119 A2 | 5/2002 |

OTHER PUBLICATIONS

Office Action issued by the Canadian Intellectual Patent Office dated Sep. 11, 2014, relating to Application No. 2,682,739.

*Primary Examiner* — Alison Hindenlang
*Assistant Examiner* — Robert J Grun
(74) *Attorney, Agent, or Firm* — Banner & Witcoff, Ltd.

(57) ABSTRACT

A method for processing a headliner, comprising the steps of forming a headliner having an edge, removing excess material from at least a portion of the edge to define a trimmed edge portion and sealing off at least a portion of the trimmed edge portion.

19 Claims, 5 Drawing Sheets

(56) References Cited

U.S. PATENT DOCUMENTS

| | | |
|---|---|---|
| 2002/0190508 A1 | 12/2002 | Jost |
| 2003/0220040 A1 | 11/2003 | Helms |
| 2005/0127718 A1* | 6/2005 | Cormier et al. ............... 296/214 |
| 2007/0042157 A1* | 2/2007 | Dooley et al. ................. 428/124 |

* cited by examiner

METHOD AND SYSTEM FOR PROCESSING A HEADLINER

CROSS REFERENCE TO RELATED APPLICATION

This Application claims priority under 35 U.S.C. §119(e) to U.S. Provisional Patent Application No. 60/908,746 filed on Mar. 29, 2007, which is entirely incorporated herein by reference.

FIELD OF THE INVENTION

The invention relates in general to a method and system for processing a headliner.

BACKGROUND OF THE INVENTION

Typically, headliners include a cover layer directed toward the passenger compartment area, designed to provide the passenger compartment area with a generally pleasing appearance.

The disclosure hereof is directed to an improved headliner manufacturing system, process for making an improved headliner and an improved headliner.

SUMMARY OF THE INVENTION

In accordance with the invention there is provided, a method for processing a headliner, comprising the steps of forming a headliner having an edge, trimming excess material from at least a portion of the edge to define a trimmed edge portion by dispensing pressurized liquid about the at least a portion of the edge, and sealing at least a portion of the trimmed edge portion.

In accordance with the invention there is further provided, a method for processing a headliner, comprising the steps of forming a headliner having an edge, trimming excess material from at least a portion of the edge to define a trimmed edge portion, and sealing at least a portion of the trimmed edge portion by cauterizing the at least a portion of the edge using a closed heat source.

In accordance with another aspect of the invention, there is provided a method for processing a headliner, comprising the steps of forming a headliner having an edge, trimming excess material from at least a portion of the edge to define a trimmed edge portion, and sealing at least a portion of the trimmed edge portion by applying a chemical about the at least a portion of the to form the seal.

In accordance with yet another aspect of the invention, there is provided a method for processing a headliner including a fabric layer and a substrate layer, comprising the steps of forming a headliner having an edge, trimming excess material from at least a portion of the edge to define a trimmed edge portion, and sealing at least a portion of the trimmed edge portion by sealing the fabric layer of the trimmed edge. In accordance with an embodiment of the invention, the method further comprises the step of sealing a substrate layer edge of the trimmed edge.

Furthermore, in accordance with the invention, there is provided a method for processing a headliner, comprising the steps of forming a headliner to define a geometry having an edge, substantially simultaneously trimming excess material from the geometry with a liquid to define a trimmed edge and sealing the trimmed edge. In accordance with an embodiment of the invention, the step of simultaneous trimming and sealing step is conducted by a high pressure liquid cutting apparatus. In accordance with a further embodiment of the invention, the sealing step further comprises the sub-step of disposing a chemical sealant about at least a portion of the edge.

In accordance with the invention, there is further provided, a method for processing an interior trim component, comprising the steps of providing a woven fabric layer, providing a substrate, forming the woven fabric and substrate into a headliner-shaped geometry, trimming excess material from the headliner-shaped geometry to define a trimmed edge of the headliner-shaped geometry by way of a high pressure liquid cutting apparatus, and sealing the trimmed edge of the headliner-shaped geometry.

In accordance with a further aspect of the invention, there is provided a method for processing an interior trim component, comprising the steps of providing a woven fabric layer, providing a substrate, forming the woven fabric and substrate into a headliner-shaped geometry, trimming excess material from the headliner-shaped geometry to define a trimmed edge of the headliner-shaped geometry, and sealing the trimmed edge of the headliner-shaped geometry by way of a chemical sealant bead applicator.

In accordance with yet a further aspect of the invention, there is provided a method for processing an interior trim component, comprising the steps of providing a woven fabric layer, providing a substrate, forming the woven fabric layer and substrate into a headliner-shape geometry, simultaneously trimming excess material from the headliner-shaped geometry to define a trimmed edge of the headliner-shaped geometry and sealing the trimmed edge of the headliner-shaped geometry.

Furthermore, in accordance with the invention, there is provided, a system for processing an interior trim component, comprising a forming apparatus for geometrically forming an interior trim component, a trimming apparatus for trimming material from the interior trim component to define a trimmed edge, and a sealing apparatus for sealing the trimmed edge.

In accordance with the invention, there is further provided, a system for processing an interior trim component, comprising a forming apparatus for geometrically forming the interior trim component, an integrated processing device that trims and seals the interior trim component, wherein the integrated processing device trims the interior trim component to define a trimmed edge and subsequently seals the trimmed edge.

BRIEF DESCRIPTION OF THE DRAWINGS

The disclosure will now be described, by way of example, with reference to the accompanying drawings, in which.

DETAILED DESCRIPTION OF THE PREFERRED EMBODIMENTS

The Figures illustrate exemplary methods, headliners and systems for making such headliners in accordance with various exemplary embodiments of the invention. It is to be generally understood that the nomenclature used herein is simply for convenience and the terms used to describe the invention should be given the broadest meaning by one of ordinary skill in the art.

Figure 1A:
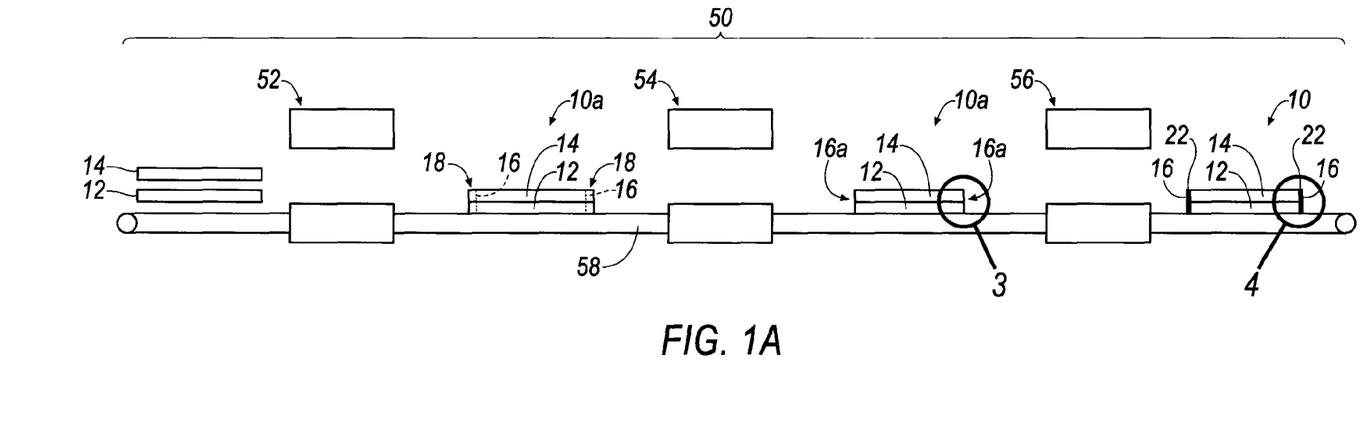
FIG. 1A is a representative view of a system for processing a headliner in accordance with an exemplary embodiment of the invention.

Referring to FIG. 1A, a headliner is shown generally at 10 and a system for processing the headliner 10 is shown generally at 50 according to an embodiment. In an embodiment, the headliner 10 may include one or more layers, and includes a fabric layer 12 and one or more substrate layer(s) 14. In an embodiment, the fabric layer 12 is woven fabric, but it is to be appreciated that the disclosure hereof is applicable to any type of fabric layer. Moreover, while the illustrated headliner 10 includes two layers 12, 14, it will be appreciated that the headliner 10 should not be limited to any number of layers and may include any desirable number of layers.

According to an embodiment, the system 50 may include a transport, such as a conveyor 58 arranged to move the headliner 10 through some or all of the manufacturing environment. While a transport is disclosed, it is to be appreciated that the invention hereof may be practiced without a transport. In an embodiment, the inventive process is performed by a single device. In an embodiment, the inventive process is performed by a plurality of devices. In an embodiment, the headliner 10 is transported between devices 52, 54, 56 as illustrated in the Figures. These and other features will become readily apparent to one of ordinary skill after consulting this disclosure.

Methods of manufacturing an untrimmed headliner and applying a cover layer thereto will now be described. It is to be appreciated that these methods should not be used to limit the inventive concept and are provided for clarity. In an embodiment, the headliner 10 is formed in conjunction with the application of a cover layer. In another embodiment, the headliner is pre-formed and the cover layer is post-applied thereto. Also, it is to be understood that headliners are made in a bevy of shapes and configurations and the exemplary shapes and configurations illustrated and described herein should not be construed as limitations.

With reference to FIG. 1A, a first device 52 is provided to form a headliner-shaped component 10a. An exemplary method for forming is described hereinbelow. In an embodiment, the forming thereof results in an edge 16a as shown in the drawings.

In an embodiment, second device 54 includes include a trimming apparatus to enhance or define the edge of the headliner 10. In an embodiment, the headliner formation previously referenced may result in excess material, such as flash material, around the edges of the formed component. It may be desirable, therefore, to define or enhance this edge. In an embodiment, the trimming apparatus 54 described herein is arranged to remove the excess material 18. According to an embodiment, the trimming apparatus 54 may include a pressurized liquid cutting device (not shown) that, by subjecting contents thereof to pressure, may be arranged to as a cutting instrument that can be used to enhance or define the edge. The trimming apparatus 54 dispenses the liquid from a nozzle (not shown). Various liquids can be employed in the trimming apparatus 54. In an embodiment, the liquid is water or water based composite. But, it is to be recognized that the disclosure should not be limited to the foregoing as one of ordinary skill in the art will recognize similar materials after considering this disclosure.

In another embodiment, the trimming apparatus 54 comprises a hot knife. In even another embodiment, the trimming apparatus comprises a blade. In yet another embodiment, the trimming apparatus 54 comprises a laser.

In an embodiment, a second device 56 is provided to seal at least a portion of a trimmed edge 16a that is resultantly defined by the trimming apparatus 54. For ease of reading, second device 56 will be referred to herein as a sealing apparatus 56. The term "seal" as used in this disclosure should be construed broadly and should not be construed as indicating a water tight means or the like. Instead, seal is used to describe the result of the processes described hereafter, which, when interpreted by one of ordinary skill in the art, should be construed as a means for reducing any upsetting to the trimmed edge.

According to an embodiment, the sealing apparatus 56 applies heat to at least a portion of the trimmed edge 16a to cauterize, bind, melt, or otherwise seal at least a portion of the trimmed edge. In an embodiment, the heat is produced in a closed system to prevent the over application of heat to the trimmed edge 16a. In an embodiment, the heat is provided as an infrared light. In another embodiment, the heat is provided by a heated rod. In yet another embodiment, the heat is provided by a heated wire. In yet another embodiment, the heat is provided by a heated blade. In an embodiment, the sealing apparatus 56 may be combined with the trimming device 54 such that the processes performed thereby are performed substantially contemporaneously.

In another embodiment, the sealing apparatus 56 applies a chemical sealant to the trimmed edge. In an embodiment, the sealing device 56 may be a sealant applicator that applies a chemical sealant bead to all of, or, alternatively, a portion of the trimmed edge 16a.

Figure 3:
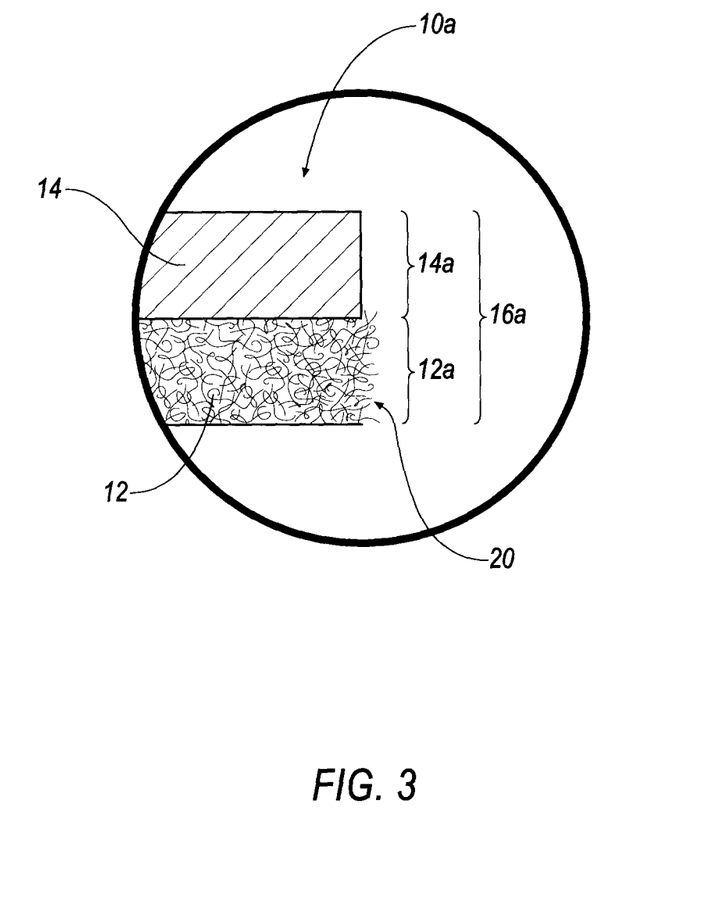
FIG. 3 is an enlarged view of a trimmed edge of a headliner-shaped component according to line 3 of FIG. 1A in accordance with an exemplary embodiment of the invention.

Referring to FIG. 3, the trimmed edge 16a is defined by trimmed layer edges 12a, 14a of the fabric and substrate layers 12, 14, respectively. The trimmed edge 12a of the fabric layer 12 may be further defined to include a plurality of loose fibers 20.

Figure 4A:
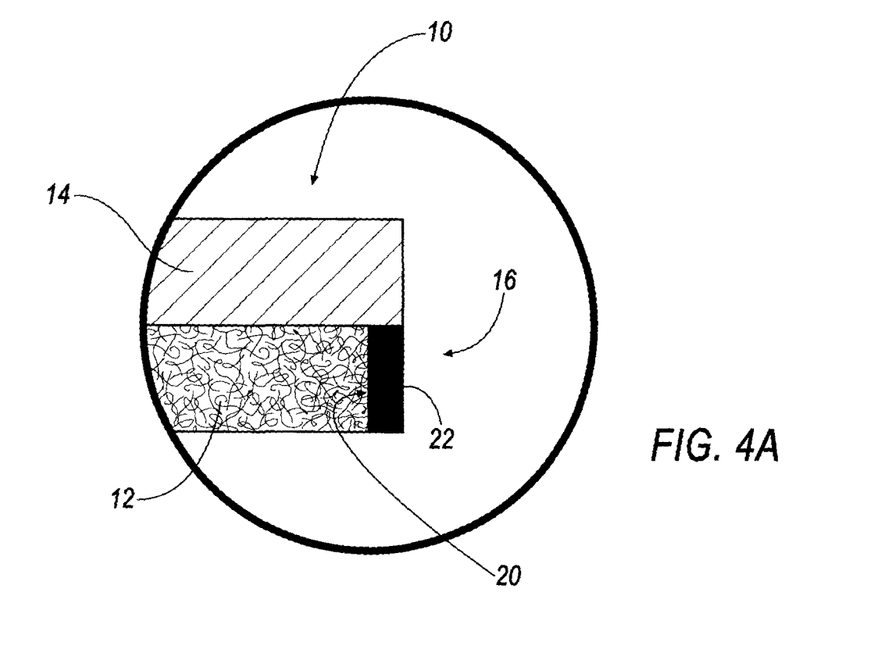
FIG. 4A is an enlarged view of a sealed edge of a headliner according to line 4 of FIG. 1A in accordance with an exemplary embodiment of the invention.
Figure 4B:
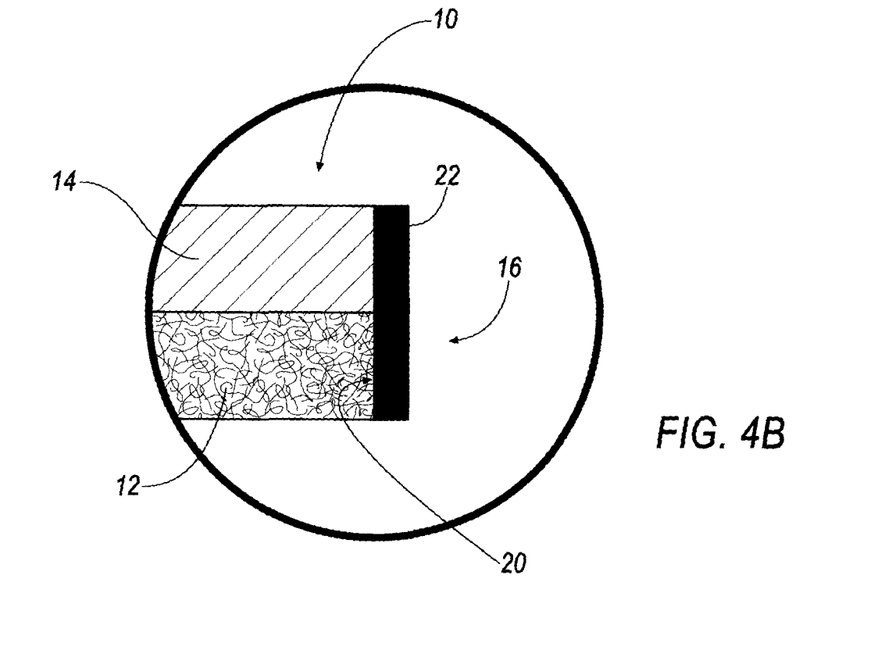
FIG. 4B is an enlarged view of a sealed edge of a headliner according to line 4 of FIG. 1A in accordance with an exemplary embodiment of the invention.

Referring to FIGS. 4A and 4B, a seal 22 may be provided to a portion of the trimmed edge 16a (i.e., at least the layer edge 12a of the fabric layer 12a as seen in FIG. 4A), or, alternatively, all of the trimmed edge 16a (i.e., the layer edge 12a of the fabric layer 12 and a portion or all of the edge layer 14a of the substrate layer 14 as seen in FIG. 4B). Once the seal 22 is provided, as desired, over the trimmed edge 16a by the sealing apparatus 56, a sealed edge is shown generally at 16.

Figure 2:
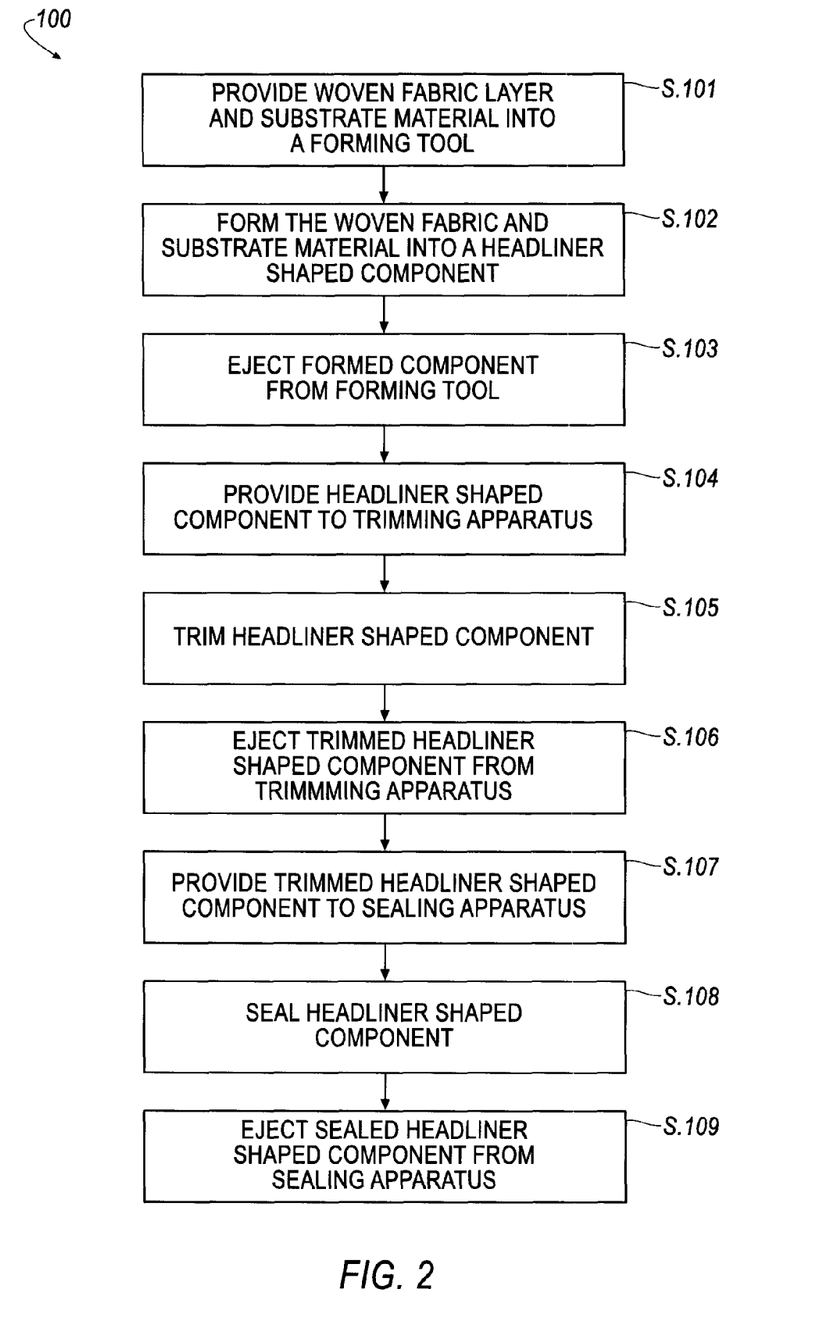
FIG. 2 is a method for processing a headliner in accordance with an exemplary embodiment of the invention.

Referring now to FIG. 2, a method for processing the headliner 10 is shown generally at 100 according to an embodiment. In general, the method 100 includes steps, S.101-S.109. First, at step, S.101, a fabric layer 12 and a substrate material 14 are provided into a forming tool 52. At step, S.102, the fabric layer 12 and substrate material 14 are geometrically formed by the forming tool 52 to provide a headliner-shaped component 10a.

According to an embodiment, steps, S.101, S.102, may include several sub-steps. For example, the fabric layer 12 and the substrate material 14 may be each defined by pre-formed layers of material as shown in FIG. 1A. Then, the preformed layers of material 12, 14 are inserted into forming tool 52, which may, for example, heat, soften, and join the fabric and substrate layers 12, 14 to each other. Thus, it will be appreciated that the fabric layer 12 and substrate material 14 may be geometrically formed into a headliner-shaped component 10a.

At step, S.103, the headliner-shaped component 10a is ejected or removed from the forming tool 52. Then, at step, S.104, the headliner-shaped component 10a is advanced or provided to a trimming apparatus 54. At step, S.105, the headliner-shaped component 10a is trimmed by the trimming apparatus 54. The trimming apparatus 54, which may include, for example, a high pressure liquid cutting device, trims the flash or excess material 18 from the headliner-shaped component 10a.

Referring to FIG. 3, a trimmed edge 16a of the headliner-shaped component 10a is illustrated according to an embodiment. As illustrated, a portion/edge 12a of the fabric layer 12 that defines the trimmed edge 16a may include a plurality of loose fiber strands 20 that are upset from a woven pattern due to the trimming operation conducted by the trimming device 54 at step, S.105.

At step, S.106, the trimmed headliner-shaped component 10a including the trimmed edge 16a is ejected or removed from the trimming apparatus 54. Then, at step, S.107, the headliner-shaped component 10a is advanced or provided to a sealing apparatus 56. At step, S.108, the sealing apparatus 56 seals the trimmed edge 16a including the loose fiber strands 20. As a result, sealing apparatus 56 provides a sealed edge 16 of the headliner-shaped component 10a with a seal 22 such that the loose fiber strands 20 are retained by the seal 22. Accordingly to an embodiment, the seal 22 may be a chemical seal. In an embodiment, the seal may be a seal resultant from the application of heat. In an embodiment, the seal may be formed from both of the foregoing processes.

Referring to FIGS. 4A and 4B, the seal 22 may retain the loose fibers 20, or, alternatively, bind the loose fibers 20 to neighboring loose fibers 20 (FIG. 4A), or, alternatively, bind loose fibers 20 to neighboring loose fibers 20 and/or the substrate layer 14 (FIG. 4B). Once the seal 22 is provided, the headliner 10 is formed and ejected from the sealing apparatus 56 at step, S.109.

Figure 1B:
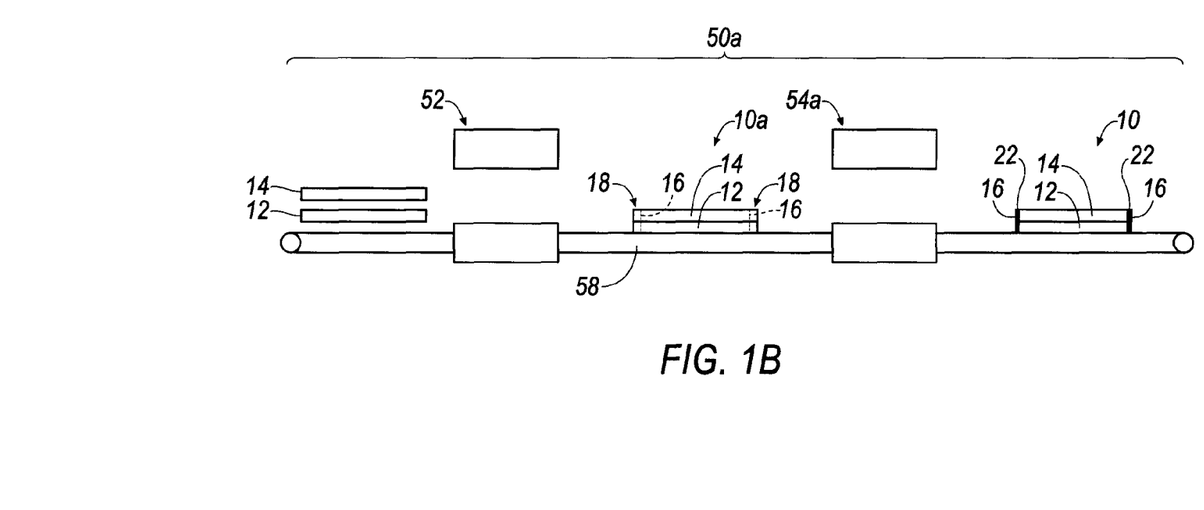
FIG. 1B is a representative view of a system for processing a headliner in accordance with an exemplary embodiment of the invention.

Referring to FIG. 1B, a system for processing the headliner 10 is shown generally at 50a according to an embodiment. Similarly as described above, the headliner 10 includes a fabric layer 12 and one or more substrate layer(s) 14. The tooling 50a for processing the headliner 10 may include several devices, which are shown generally at 52 and 54a. Operation of the devices 52 and 54a are explained in greater detail in a method 200 shown in FIG. 5. As described above, it is appreciated that the tooling may be a single device and the invention should not be so limited to several devices.

With continued reference to the drawings, device 52 includes a forming tool. The device 54a is generally defined to include an integrated processing device that performs multiple processing steps. According to an embodiment, the integrated processing device 54a performs the steps of trimming and sealing the headliner-shaped component 10a, which are otherwise conducted individually by devices 54 and 56 of FIG. 1A.

According to an embodiment, the integrated processing device 54a may include a high pressure liquid cutting device that simultaneously trims and seals the headliner-shaped component 10a. According to an embodiment, the liquid employed by the high pressure liquid cutting device that is utilized to trim the headliner shaped component 10a may include a liquid that is defined by a chemical sealant material. Alternatively, the high pressure liquid cutting device may utilize a liquid that includes, for example, a non-sealant liquid, such as, for example, water, and a sealant material additive that complements the non-sealant liquid. As such, the high pressure liquid cutting device may actually utilize a liquid that is defined in whole, or, at least in part, by a sealant material that simultaneously trims and seals the headliner-shaped component 10a.

Figure 5:
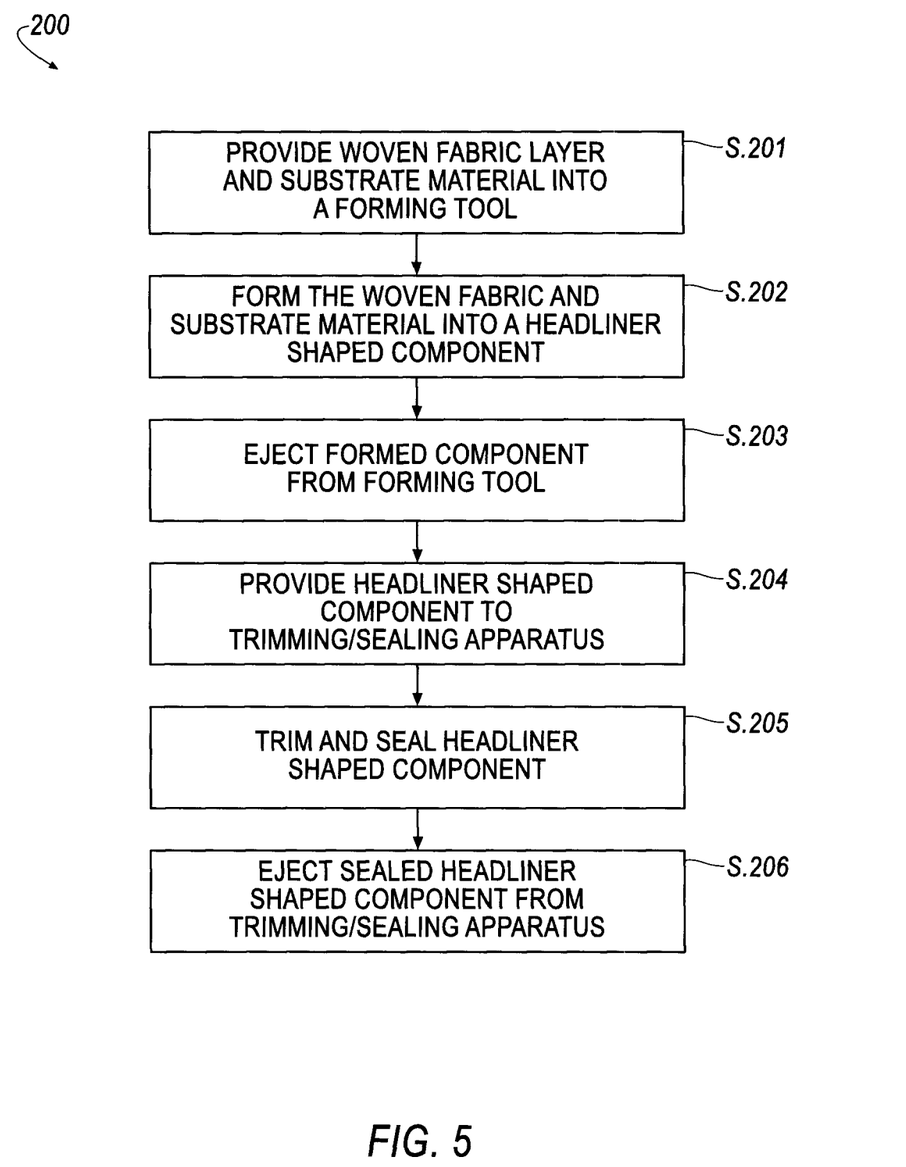
FIG. 5 is a method for processing a headliner in accordance with an exemplary embodiment of the invention.

Referring to FIG. 5, a method for processing the headliner 10 is shown generally at 200 according to an embodiment.

In general, the method 200 includes steps, S.201-S.206. First, at step, S.201, a fabric layer 12 and a substrate material 14 are provided into a forming tool 52. At step, S.202, the fabric layer 12 and substrate material 14 are geometrically formed, within the forming tool 52 to provide a headliner-shaped component 10a.

At step, S.203, the headliner-shaped component 10a is ejected or removed from the forming tool 52. Then, at step, S.204, the headliner-shaped component 10a is advanced or provided to the integrated processing device 54a. At step, S.205, the headliner-shaped component 10a is simultaneously trimmed and sealed by the integrated processing device 54a by trimming flash or excess material 18 while simultaneously sealing a trimmed edge 16a of the headliner-shaped component 10a with a liquid from a high pressure liquid cutting device that is defined in whole or at least in part by a sealant material. At step, S.206, the trimmed headliner-shaped component 10a including the seal 22 is ejected or removed from the integrated to processing device 54a.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed:

1. A method for processing a headliner, comprising the steps of:
    transporting a first panel layer and a second panel layer to a first station;
    forming a headliner having an edge from the first panel layer and the second panel layer, wherein said forming step occurs at the first station;
    transporting the headliner to a second station;
    removing material from at least a portion of the edge to define a trimmed edge portion, wherein said removing step results in at least one of defining and enhancing the at least a portion of the edge, and wherein said removing step occurs at the second station; and
    after said removal step, sealing off at least a portion of the trimmed edge portion, by using one of a cauterizing apparatus and a chemical sealant bead applicator, wherein the at least a portion of the trimmed edge portion that is sealed has fiber strands loosened from the headliner at the trimmed edge during said removing step.

2. The method according to claim 1, wherein the removing step further comprises the substep of: directing pressurized fluid about the at least a portion of the edge of the headliner whereby the pressuring fluid removes material therefrom to define the trimmed edge portion.

3. The method according to claim 2, wherein the sealing step is performed by applying heat to at least a portion of the trimmed edge portion using the cauterizing apparatus.

4. The method according to claim 2, wherein the sealing step is performed by:

applying a chemical sealant bead to at least a portion of the trimmed edge portion using the chemical sealant bead applicator; and applying heat to at least a portion of the trimmed edge portion using the causterizing apparatus.

5. The method according to claim 3, wherein the cauterizing apparatus comprises a device selected from the group consisting of an infrared emitting device, a heated rod, a heated wire, and a heated blade.

6. The method according to claim 2, wherein the headliner includes a first fabric layer and a second substrate layer, wherein the sealing step is directed, in substantial part, toward the first fabric layer.

7. The method according to claim 2, wherein the headliner includes a first fabric layer and a second substrate layer, wherein the sealing step is directed, in substantial part, toward the second substrate layer.

8. The method according to claim 2, wherein the headliner includes a first fabric layer and a second substrate layer, wherein the sealing step is directed at both layers.

9. The method according to claim 2, wherein the removing step is provided by a device selected from the group consisting of a pressurized liquid cutting device, a blade and a laser.

10. A method for processing an interior trim component, comprising the steps of:
    providing a woven fabric layer;
    providing a substrate layer;
    forming the woven fabric layer and the substrate layer into a headliner-shaped geometry;
    trimming excess material from the headliner-shaped geometry to define
    a trimmed edge of the headliner-shaped geometry; and
    after the trimming step,
    applying heat to the trimmed edge of the headliner-shaped geometry; and
    sealing the trimmed edge of the headliner-shaped geometry.

11. The method according to claim 10, wherein the trimming step is conducted by
    a high pressure liquid cutting apparatus.

12. The method according to claim 10, wherein the sealing step includes the step of:
    forming a seal over the woven fabric layer of the trimmed edge for sealing the trimmed edge of said woven fabric layer.

13. The method according to claim 12, wherein the sealing step further includes the step of: forming the seal over a substrate layer of the trimmed edge for sealing the trimmed edge of said substrate layer.

14. A method for processing an interior trim component, comprising the steps of: providing a woven fabric layer; providing a substrate layer; forming the woven fabric layer and the substrate layer into a headliner-shaped geometry; trimming excess material from the headliner-shaped geometry to define a trimmed edge of the headliner-shaped geometry; and after the trimming step, sealing the trimmed edge of the headliner-shaped geometry wherein the trimmed edge of the headliner-shaped geometry includes: a woven fabric layer trimmed edge, and a substrate layer trimmed edge, wherein the woven fabric layer trimmed edge is defined by a plurality of loose fiber strands and wherein said sealing step is conducted by one of a cauterizing apparatus and a chemical sealant bead applicator.

15. The method according to claim 14 further comprising the step of:
    as a result of the sealing step, forming a seal over the plurality of loose fiber strands of the woven fabric layer trimmed edge for
    forming a sealed edge over only the woven fabric layer trimmed edge and not the substrate layer trimmed edge.

16. The method according to claim 14 further comprising the step of:
    as a result of the sealing step, forming a seal over both of the substrate layer trimmed edge and the plurality of loose fiber strands of the woven fabric layer trimmed edge for
    forming a sealed edge over both of the substrate layer trimmed edge and the woven fabric layer trimmed edge.

17. The method according to claim 1, wherein said sealing step occurs at the second station.

18. The method according to claim 1 further comprising, prior to said sealing step, a step of transporting the headliner to a third station, wherein said sealing step occurs at the third station.

19. The method according to claim 5, wherein the cauterizing apparatus comprises an infrared emitting device.

* * * * *